UNITED STATES PATENT OFFICE.

ADAM SCOTT, ROBERT SCOTT, AND CHARLES A. SKENE, OF WAMEGO, KANSAS.

IMPROVEMENT IN SHEEP-WASHES.

Specification forming part of Letters Patent No. 200,941, dated March 5, 1878; application filed December 6, 1877.

*To all whom it may concern:*

Be it known that we, ADAM SCOTT, ROBERT SCOTT, and CHARLES A. SKENE, of Wamego, in the county of Pottawatomie and State of Kansas, have invented a new and Improved Sheep-Wash, of which the following is a specification:

The object of our invention is to furnish a non-poisonous wash for the destruction of insects infesting the skin of animals, and for the cure of scab, scratches, and similar animal diseases.

The mixture or wash consists of the following ingredients in about the following proportions: To make three gallons of the wash, take of tobacco, five pounds; concentrated lye, (potash,) one pound; turpentine, one gallon; tar, one gallon.

In manufacturing, the tobacco is infused in two or more gallons of boiling water, the infusion strained, the potash (or lye) added, and the mixture boiled down to the volume of one gallon, and cooled. The turpentine and tar are then added. Instead of one gallon of turpentine and one gallon of tar, two gallons of oil of tar may be used. At times it is necessary to vary these quantities, as the potash, turpentine, and tar are sometimes of inferior quality. The wash thus made is used either concentrated, or more or less diluted with water, as may be required for different purposes.

Having thus described our invention, we claim as new and desire to secure by Letters Patent—

A sheep-wash formed of the described proportions of tobacco, potash, turpentine, and tar, as and for the purpose specified.

ADAM SCOTT.
ROBERT SCOTT.
CHARLES ANDERSON SKENE.

Witnesses:
JAS. HUNSTON,
F. A. WHITLOCK.